United States Patent
Horio et al.

(10) Patent No.: US 10,348,002 B2
(45) Date of Patent: Jul. 9, 2019

(54) WIRING MEMBER HAVING MOLDED PART

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hitoshi Horio, Yokkaichi (JP); Kouji Fukumoto, Yokkaichi (JP); Daisuke Hashimoto, Yokkaichi (JP)

(73) Assignees: AUTONETWORKS TECHNOLOGIES, LTD, Yokkaichi (JP); SUMITOMO WIRING SYSTEMS, LTD., Yokkaichi (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/773,608

(22) PCT Filed: Nov. 4, 2016

(86) PCT No.: PCT/JP2016/082741
§ 371 (c)(1),
(2) Date: May 4, 2018

(87) PCT Pub. No.: WO2017/086182
PCT Pub. Date: May 26, 2017

(65) Prior Publication Data
US 2019/0081418 A1 Mar. 14, 2019

(30) Foreign Application Priority Data
Nov. 19, 2015 (JP) .................. 2015-226525

(51) Int. Cl.
H02G 15/04 (2006.01)
H01R 4/72 (2006.01)
(Continued)

(52) U.S. Cl.
CPC ............. *H01R 4/72* (2013.01); *H01B 7/282* (2013.01); *H01R 4/70* (2013.01); *H02G 15/046* (2013.01); *H01R 43/24* (2013.01)

(58) Field of Classification Search
CPC .................................................. H02G 15/046
See application file for complete search history.

(56) References Cited

U.S. PATENT DOCUMENTS 6,666,732 B1 * 12/2003 Endacott ............. H01R 4/187
439/730
8,585,415 B2 * 11/2013 Marsh .................. H01R 9/0527
439/98

(Continued)

FOREIGN PATENT DOCUMENTS

JP  2012104236 A  5/2012
JP  2014146538 A  8/2014

(Continued)

OTHER PUBLICATIONS

International Search Report for Application No. PCT/JP2016/082741 dated Jan. 17, 2017; 5 pages.

*Primary Examiner* — Hung V Ngo
(74) *Attorney, Agent, or Firm* — Reising Ethington, P.C.

(57) ABSTRACT

A molded portion-equipped wiring member includes a conductor portion that is wire-shaped, a terminal that is connected to an end portion of the conductor portion, a molded portion that covers a connection portion between the conductor portion and the terminal such that the terminal projects from a first end portion side and the conductor portion extends from a second end portion side, and a sheath member that surrounds the conductor portion in a state (Continued)

where a gap of separation from the conductor portion is formed in an intermediate portion, the sheath member being in close contact with the second end portion of the molded portion in an end portion.

5 Claims, 4 Drawing Sheets

(51) Int. Cl.
*H01R 4/70* (2006.01)
*H01B 7/282* (2006.01)
*H01R 43/24* (2006.01)

(56) References Cited

U.S. PATENT DOCUMENTS

| | | | | |
|---|---|---|---|---|
| 2005/0009394 | A1* | 1/2005 | Kameyama | H01R 13/5216 |
| | | | | 439/274 |
| 2006/0084327 | A1* | 4/2006 | Chadbourne | H01R 4/62 |
| | | | | 439/784 |
| 2007/0049085 | A1* | 3/2007 | Stagi | H01B 7/285 |
| | | | | 439/199 |
| 2015/0047900 | A1 | 2/2015 | Suetani et al. | |
| 2016/0134093 | A1* | 5/2016 | Albert | H01R 9/0518 |
| | | | | 174/360 |

FOREIGN PATENT DOCUMENTS

| | | |
|---|---|---|
| JP | 2015135761 A | 7/2015 |
| JP | 2015135793 A | 7/2015 |

* cited by examiner

WIRING MEMBER HAVING MOLDED PART

CROSS REFERENCE TO RELATED APPLICATIONS

This application claims the priority of Japanese patent application JP2015-226525 filed on Nov. 19, 2015, the entire contents of which are incorporated herein.

TECHNICAL FIELD

The present invention relates to a molded portion-equipped wiring member that includes a molded portion.

BACKGROUND ART

As one example, Patent Document 1 (JP2013-187041A) discloses a molded portion-equipped electrical wire that includes a terminal-equipped electrical wire in which a terminal is connected to an end portion of an insulated electrical wire that has a conductor and an insulating covering, and also includes a molded portion that covers a connection portion between the insulated electrical wire and the terminal.

SUMMARY

However, in the example shown in Patent Document 1, the insulating covering is in close contact with the entirety of the conductor, thus resulting in poor flexibility for the insulated electrical wire.

An object of the present disclosure is to improve the flexibility of a wiring portion of a wiring member that includes a molded portion.

A molded portion-equipped wiring member according to a first aspect includes: a conductor portion that is wire-shaped; a terminal that is connected to an end portion of the conductor portion; a molded portion that covers a connection portion between the conductor portion and the terminal such that the terminal projects from a first end portion side and the conductor portion extends from a second end portion side; and a sheath member that surrounds the conductor portion in a state where a gap of separation from the conductor portion is formed in an intermediate portion, the sheath member being in close contact with a second end portion of the molded portion in an end portion.

A molded portion-equipped wiring member according to a second aspect is an aspect of the molded portion-equipped wiring member according to the first aspect. In the molded portion-equipped wiring member according to the second aspect, an outer circumferential surface of the end portion of the sheath member and an inner circumferential surface of the second end portion of the molded portion are in close contact with each other.

A molded portion-equipped wiring member according to a third aspect is an aspect of the molded portion-equipped wiring member according to the second aspect. In the molded portion-equipped wiring member according to the third aspect, the molded portion-equipped wiring member further includes a first adhesive that is provided between the outer circumferential surface of the end portion of the sheath member and the inner circumferential surface of the second end portion of the molded portion, and that causes the outer circumferential surface of the end portion of the sheath member and the inner circumferential surface of the second end portion of the molded portion to be in close contact with each other.

A molded portion-equipped wiring member according to a fourth aspect is an aspect of the molded portion-equipped wiring member according to any one of the first to third aspects. In the molded portion-equipped wiring member according to the fourth aspect, the molded portion-equipped wiring member further includes a second adhesive that is provided between an inner circumferential surface of the end portion of the sheath member and an outer circumferential surface of the conductor portion, and causes the inner circumferential surface of the end portion of the sheath member and the outer circumferential surface of the conductor portion to be in close contact with each other.

A molded portion-equipped wiring member according to a fifth aspect is an aspect of the molded portion-equipped wiring member according to the first aspect. In the molded portion-equipped wiring member according to the fifth aspect, the sheath member includes an elastic ring-shaped portion that is a portion formed at the end portion, is capable of undergoing elastic deformation, and has an inner circumferential surface that comes into close contact with an outer circumferential surface of the second end portion of the molded portion.

A molded portion-equipped wiring member according to a sixth aspect is an aspect of the molded portion-equipped wiring member according to the fifth aspect. In the molded portion-equipped wiring member according to the sixth aspect, a locking portion is formed in the molded portion, and the molded portion-equipped wiring member further comprises a fixing member that includes a portion that comes into contact with the elastic ring-shaped portion so as to press a surface of the elastic ring-shaped portion that faces the molded portion against the molded portion, the fixing member being provided with a locked portion that is locked together with the locking portion in a state where the surface of the elastic ring-shaped portion that faces the molded portion is pressed against the molded portion.

A molded portion-equipped wiring member according to a seventh aspect is an aspect of the molded portion-equipped wiring member according to the fifth aspect. In the molded portion-equipped wiring member according to the seventh aspect, a locking portion is formed in the molded portion, and the elastic ring-shaped portion is provided with a locked portion that is locked together with the locking portion in a state where a surface of the elastic ring-shaped portion that faces the molded portion is pressed against the molded portion.

In the above aspects, a gap of separation from the conductor portion is formed in the intermediate portion of the sheath member. The conductor portion is a wiring portion of the molded portion-equipped conductive member. Accordingly, the wiring portion has excellent flexibility in this molded portion-equipped wiring member.

In the second aspect, the outer circumferential surface of the end portion of the sheath member and the inner circumferential surface of the second end portion of the molded portion are in close contact with each other, thus suppressing the intrusion of a liquid through a space therebetween.

In the third aspect, due to the first adhesive that is provided between the outer circumferential surface of the end portion of the sheath member and the inner circumferential surface of the second end portion of the molded portion, it is possible to more reliably suppress the intrusion of a liquid through a space between the outer circumferential surface of the end portion of the sheath member and the inner circumferential surface of the second end portion of the molded portion.

In the fourth aspect, due to the second adhesive that is provided between the inner circumferential surface of the end portion of the sheath member and the outer circumferential surface of the conductor portion, it is possible to more reliably suppress the case where molding resin for forming the molded portion intrudes inward from the end portion of the sheath member during molding processing.

In the fifth aspect, the inner circumferential surface of the elastic ring-shaped portion comes into close contact with the outer circumferential surface of the second end portion of the molded portion due to elastic force of the elastic ring-shaped portion, thus more reliably suppressing the case where a liquid intrudes through a space between the inner circumferential surface of the elastic ring-shaped portion and the outer circumferential surface of the second end portion of the molded portion.

In the sixth aspect, the surface of the elastic ring-shaped portion that faces the molded portion is pressed against the molded portion, thus making it possible to more reliably suppress the intrusion of a liquid through a space therebetween. In other words, the water stop capability is further improved.

In the seventh aspect, the surface of the elastic ring-shaped portion that faces the molded portion is pressed against the molded portion, thus making it possible to more reliably suppress the intrusion of a liquid through a space therebetween. In other words, the water stop capability is further improved. Also, it is possible to suppress an increase in the number of parts that constitute the molded portion-equipped wiring member.

DESCRIPTION OF EMBODIMENTS

Figure 1:
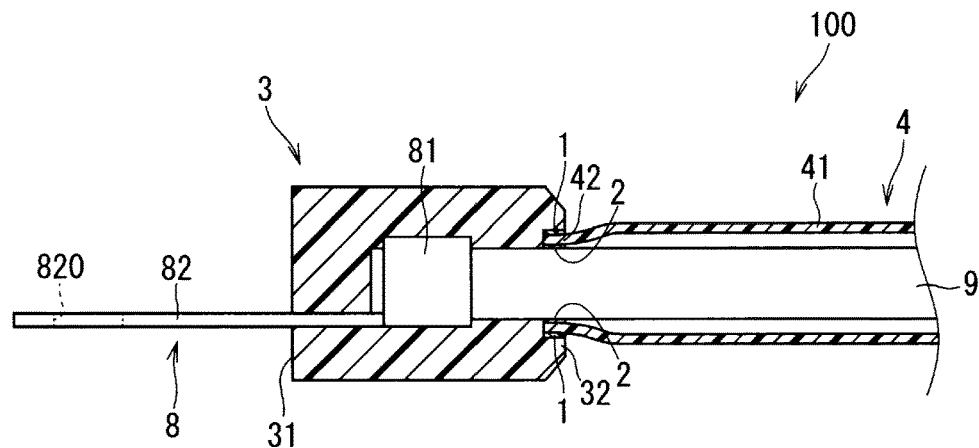
FIG. 1 is a cross-sectional view of a molded portion-equipped wiring member according to a first embodiment.

Hereinafter, embodiments of the present disclosure will be described with reference to the accompanying drawings. The following embodiments are examples of embodiments of the present disclosure, and are not intended to limit the technical scope of the present invention.

First Embodiment

First, a molded portion-equipped wiring member 100 according to a first embodiment will be described with reference to FIGS. 1 and 2. The molded portion-equipped wiring member 100 includes a conductor portion 9, a terminal 8, a molded portion 3, and a sheath member 4. Note that here, the molded portion-equipped wiring member 100 further includes a first adhesive 1 and a second adhesive 2.

The molded portion-equipped wiring member 100 is for installation in a vehicle such as an automobile. FIG. 1 is a lateral cross-sectional view of the molded portion-equipped wiring member 100 according to the first embodiment. FIG. 2 is an illustrative diagram illustrating part of a manufacturing method for the molded portion-equipped wiring member 100 according to the first embodiment.

The following describes details of constituent elements of the molded portion-equipped wiring member 100. First, the conductor portion 9 will be described.

The conductor portion 9 is a conductive member, and may be a metallic member that has copper, aluminum, or the like as a main component. Also, the conductor portion 9 is a wire-shaped member. The conductor portion 9 may be stranded wire that is formed by twisting strands together, or a braided wire formed by braiding strands, for example.

Next, the terminal 8 will be described. In the molded portion-equipped wiring member 100, the terminal 8 is connected to an end portion of the conductor portion 9. The terminal 8 is a member formed by a metal that has copper or the like as a main component.

Here, the terminal 8 includes a conductor connection portion 81 and a partner connection portion 82. The conductor connection portion 81 is a portion to which the end portion of the conductor portion 9 is physically connected. Here, the conductor connection portion 81 includes a crimp piece that can be crimped to the end portion of the conductor portion 9. In the molded portion-equipped wiring member 100, the crimp piece of the conductor connection portion 81 is crimped in a state of surrounding the end portion of the conductor portion 9, thus crimping the conductor connection portion 81 and the conductor portion 9 together. Note that as another example, the terminal and the conductor portion 9 may be connected by welding such as ultrasonic welding. In this case, the conductor connection portion of the terminal may be shaped as a flat plate to which the end portion of the conductor portion 9 can be welded, for example.

Also, the partner connection portion 82 is a portion that can be connected to a partner member to which the terminal 8 is to be connected. Here, a bolt hole 820 that enables bolt-fastening to the partner member is formed in the partner connection portion 82. Note that the partner member may be a battery, a metal body (terminal block), or the like.

Next, the sheath member 4 will be described. The sheath member 4 surrounds the conductor portion 9 in a state where a gap of separation from the conductor portion 9 is formed in an intermediate portion 41, and the sheath member 4 is in close contact with a second end portion 32 of the molded portion 3 in an end portion 42.

Here, the expression that the sheath member 4 is in close contact with the second end portion 32 of the molded portion 3 in the end portion 42 means that the end portion 42 of the sheath member 4 and the second end portion 32 of the molded portion 3 are in contact either directly or indirectly via another member such that a gap capable of becoming a liquid intrusion path is not formed between the end portion 42 of the sheath member 4 and the second end portion 32 of the molded portion 3.

In the present embodiment, the end portion 42 of the sheath member 4 is adhered to the second end portion 32 of the molded portion 3 using the later-described first adhesive 1 such that no gap is formed. Specifically, the end portion 42 of the sheath member 4 and the second end portion 32 of the molded portion 3 are adhered using the first adhesive 1 that is provided over the entire circumference between the outer circumferential surface of the end portion 42 of the sheath member 4 and the inner circumferential surface of the second end portion 32 of the molded portion 3. In other words, the present embodiment is an example of the case where the end portion 42 of the sheath member 4 is in close contact with the second end portion 32 of the molded portion 3 via the first adhesive 1.

However, as another example, the end portion of the sheath member may be in contact with the second end portion with no gap therebetween and without the first adhesive therebetween.

The following describes details of the sheath member 4 of the present embodiment. The sheath member 4 surrounds the conductor portion 9 in a state where a gap of separation from the conductor portion 9 is formed in the intermediate portion 41. Here, a gap is formed between the intermediate portion 41 and the conductor portion 9 over the entire extending-direction length of the sheath member 4. For this reason, the inner diameter of the intermediate portion 41 may be configured to be larger than the outer diameter of the conductor portion 9.

Also, as shown in FIG. 1, here, the end portion 42 of the sheath member 4 surrounds the conductor portion 9 in a state where the inner circumferential surface of the end portion 42 is in close contact with the outer circumferential surface of the conductor portion 9. Accordingly, here, the sheath member 4 includes the intermediate portion 41 that has a relatively large inner diameter and the end portion 42 that has a smaller inner diameter than the intermediate portion 41.

Note that a case is also conceivable in which the end portion of the sheath member surrounds the conductor portion in a state where a gap of separation from the conductor portion is formed in the intermediate portion likewise to the intermediate portion. In this case, the sheath member may include the intermediate portion with an inner diameter that is larger than the outer diameter of the conductor portion, and the end portion with an inner diameter that is the same as or larger than the inner diameter of the intermediate portion, for example.

Here, the expression that the inner circumferential surface of the end portion 42 of the sheath member 4 is in close contact with the outer circumferential surface of the conductor portion 9 means that the end portion 42 of the sheath member 4 and the conductor portion 9 are in contact either directly or indirectly via another member such that a gap capable of becoming a liquid intrusion path is not formed between the end portion 42 of the sheath member 4 and the conductor portion 9.

In the present embodiment, the end portion 42 of the sheath member 4 is adhered to the conductor portion 9 with no gap therebetween using the later-described second adhesive 2. Specifically, the end portion 42 of the sheath member 4 and the conductor portion 9 are adhered using the second adhesive 2 that is provided over the entire circumference between the inner circumferential surface of the end portion 42 of the sheath member 4 and the outer circumferential surface of the conductor portion 9. In other words, the present embodiment is an example of the case where the end portion 42 of the sheath member 4 is in close contact with the conductor portion 9 via the second adhesive 2.

However, as another example, the end portion of the sheath member may be in contact with the conductor portion with no gap therebetween and without the second adhesive therebetween. This will be described in detail later.

Here, the sheath member 4 is formed by a heat shrink tube that has been partially heat-shrunk. A heat shrink tube is a heat-shrinking type of tube that shrinks when heated. The heat shrink tube is a tube-shaped member that is formed by a synthetic resin such as a polyolefin-based resin or a nylon-based resin, for example. The heat shrink tube can be obtained by molding a resin member into the shape of a very narrow tube by extrusion molding, performing crosslinking treatment, stretching the resin member into a wide tube shape in a heated state, and then cooling the resin member. The heat shrink tube obtained in this way has a shape-memory property of, when heated, shrinking to the thin tube shape it had before being stretched.

Figure 2:
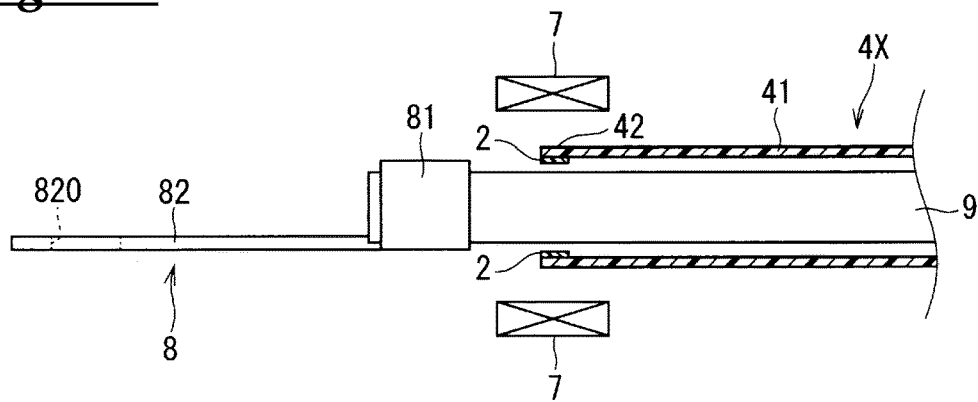
FIG. 2 is an illustrative diagram illustrating part of a manufacturing method for obtaining the molded portion-equipped wiring member according to the first embodiment.

Also, here, as shown in FIG. 2, the thermoplastic second adhesive 2 is provided on the inner circumferential surface of the end portion 42 of an unshrunk heat shrink tube 4X. Note that it is preferable that the second adhesive 2 is provided over the entire circumference of the inner circumferential surface of the end portion 42 of the unshrunk heat shrink tube 4X. A modified olefin-based or polyester-based hot-melt adhesive or the like may be used as the second adhesive 2.

In the present embodiment, the sheath member 4 is obtained by the following procedure, for example. First, the conductor portion 9 is inserted into the unshrunk heat shrink tube 4X. Note that here, the unshrunk heat shrink tube 4X has an inner diameter that is larger than the outer diameter of the conductor portion 9. Then, in the state where the conductor portion 9 has been inserted into the unshrunk heat shrink tube 4X, a heating portion 7 such as a heater is used to heat only the end portion 42 of the unshrunk heat shrink tube 4X. Accordingly, only the end portion 42 of the unshrunk heat shrink tube 4X shrinks. The inner circumferential surface of the shrunk end portion 42 is thus adhered to the outer circumferential surface of the conductor portion 9 by the second adhesive 2.

Note that as another example, a case is conceivable in which the second adhesive 2 is not provided on the inner circumferential surface of the end portion 42 of the unshrunk heat shrink tube 4X, and the end portion 42 is brought into close contact with the outer circumferential surface of the conductor portion 9, with no gap therebetween, using the shrinking force of the heat shrink tube 4X itself.

On the other hand, the intermediate portion 41 is not heated, and remains in the unshrunk state. For this reason, the intermediate portion 41 does not come into contact with the outer circumferential surface of the conductor portion 9 even after the end portion 42 is heated, and a gap is formed between the inner circumferential surface of the intermediate portion 41 and the outer circumferential surface of the conductor portion 9.

Next, the molded portion 3 will be described. The molded portion 3 is a member that covers the connection portion between the conductor portion 9 and the terminal 8 such that the terminal 8 projects from the first end portion 31 side of the molded portion 3 and the conductor portion 9 extends from the second end portion 32 side of the molded portion 3. The molded portion 3 may be a member that is formed by PBT (polybutylene terephthalate) resin, PPS (polyphenylene sulfide) resin, PPA (polyphthalamide) resin, LCP resin (liquid crystal polymer), a phenol-based, polyester-based, polyamide-based, or epoxy-based resin, or the like.

Here, the second end portion 32 of the molded portion 3 surrounds the end portion 42 of the sheath member 4. Also, the first adhesive 1 is provided between the inner circumferential surface of the second end portion 32 of the molded portion 3 and the outer circumferential surface of the end portion 42 of the sheath member 4, and the inner circumferential surface of the second end portion 32 of the molded portion 3 and the outer circumferential surface of the end portion 42 of the sheath member 4 are adhered together by this first adhesive 1. In other words, the inner circumferential surface of the second end portion 32 of the molded portion 3 and the outer circumferential surface of the end portion 42 of the sheath member 4 are in close contact. Note that the first adhesive 1 is an adhesive that is polyamide-based, modified olefin-based, polyester-based, or the like.

The following describes molding processing for molding the molded portion 3. In the present embodiment, a step for surrounding the conductor portion 9 with the sheath member 4 is performed before molding processing. For example, the first adhesive 1 is provided by being applied to the outer circumferential surface of the end portion 42 of the sheath member 4. Note that it is preferable that the first adhesive 1 is provided over the entire circumference of the outer circumferential surface of the end portion 42 of the sheath member 4.

Thereafter, the connection portion between the conductor portion 9 and the terminal 8 that is surrounded by the sheath member 4 is arranged inside a mold used in molding processing. Here, the region extending from the end portion 42 of the sheath member 4 to the portion between the conductor connection portion 81 of the terminal 8 and the partner connection portion 82 is arranged inside the mold. A molding resin for forming the molded portion 3 is then poured into the mold, and when this molding resin hardens, the molded portion 3 that covers the connection portion between the terminal 8 and the conductor portion 9 is formed.

Also, here, the molding resin for forming the molded portion 3 hardens in a state of being adhered to the outer circumferential surface of the end portion 42 of the sheath member 4 by the first adhesive 1 that is provided on the outer circumferential surface of the end portion 42 of the sheath member 4, that is to say in a state where the molding resin for forming the molded portion 3 is in close contact with the outer circumferential surface of the end portion 42 of the sheath member 4. This thus suppresses the formation of a gap capable of becoming a liquid intrusion path between the molded portion 3 and the end portion 42 of the sheath member 4.

In the molded portion-equipped wiring member 100 of the present embodiment, a gap is formed between the intermediate portion 41 of the sheath member 4 and the conductor portion 9, and therefore the conductor portion 9 (i.e., the wiring portion of the molded portion-equipped wiring member 100) can bend relatively easily. Accordingly, the wiring portion has excellent flexibility in the molded portion-equipped wiring member 100.

Also, in the present embodiment, due to the first adhesive 1 that is provided between the outer circumferential surface of the end portion 42 of the sheath member 4 and the inner circumferential surface of the second end portion 32 of the molded portion 3, it is possible to reliably suppress the intrusion of a liquid through a space between the outer circumferential surface of the end portion 42 of the sheath member 4 and the inner circumferential surface of the second end portion 32 of the molded portion 3. In other words, the water-stopping capability of the molded portion-equipped wiring member 100 is further improved.

Also, in the present embodiment, due to the second adhesive 2 that is provided between the inner circumferential surface of the end portion 42 of the sheath member 4 and the outer circumferential surface of the conductor portion 9, it is possible to more reliably suppress the case where the molding resin for forming the molded portion 3 intrudes inward from the end portion 42 of the sheath member 4 during molding processing.

Also, in the present embodiment, the second end portion 32 of the molded portion 3 is formed so as to surround the end portion 42 of the sheath member 4. For this reason, an increase in the size of the outer shape of the molded portion 3 can be suppress in the present embodiment more than in the case where the sheath member covers the outer circumferential surface of the molded portion, for example.

Second Embodiment

Figure 3:
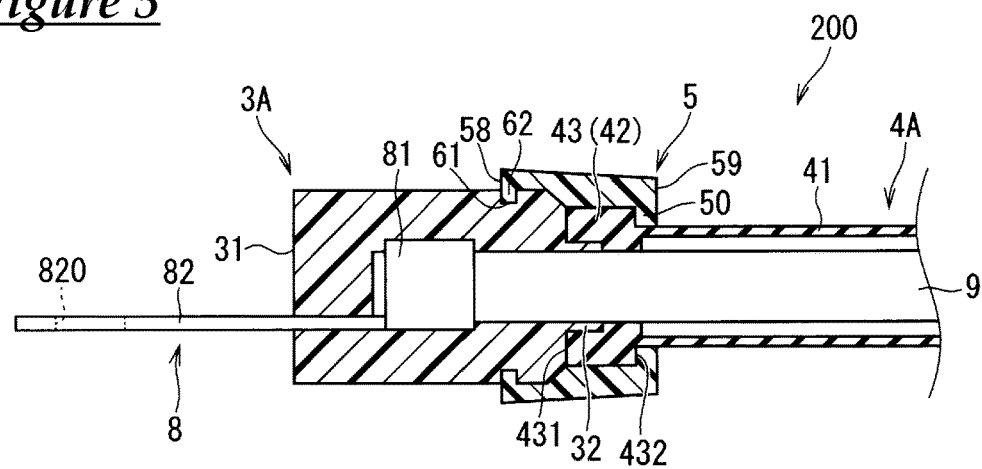
FIG. 3 is a cross-sectional view of a molded portion-equipped wiring member according to a second embodiment.
Figure 4:
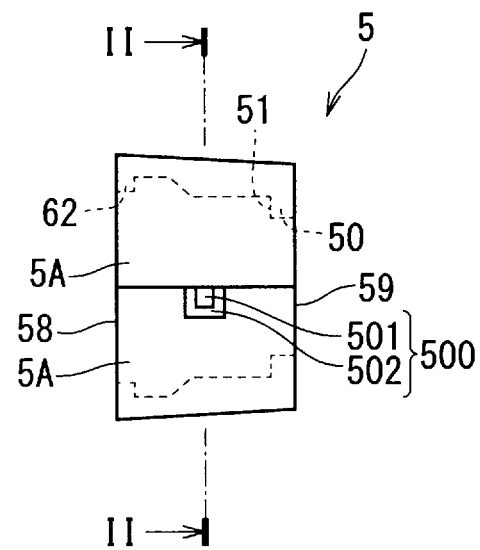
FIG. 4 is a side view of a fixing member included in the molded portion-equipped wiring member according to the second embodiment.
Figure 5:
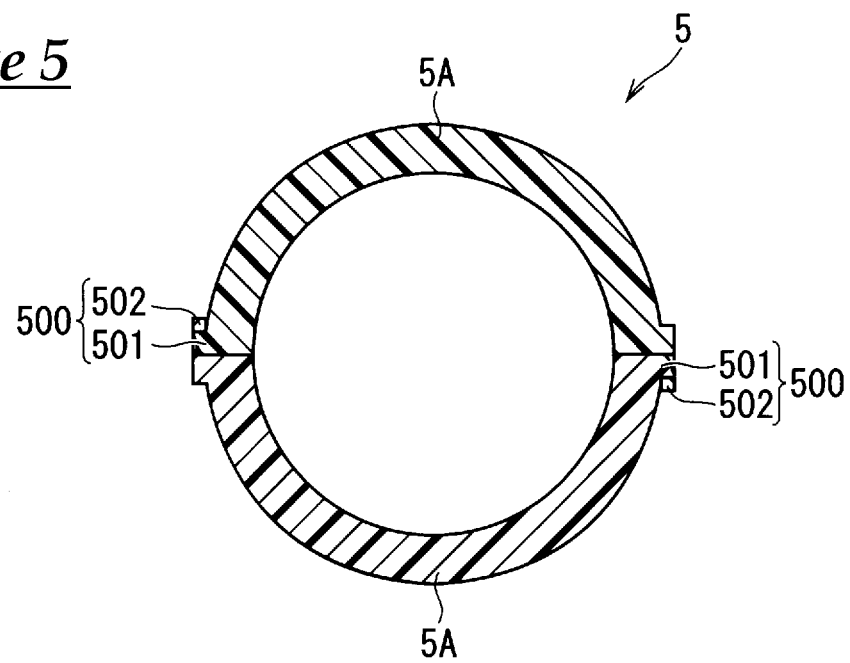
FIG. 5 is a cross-sectional view of the fixing member included in the molded portion-equipped wiring member according to the second embodiment.
Figure 6:
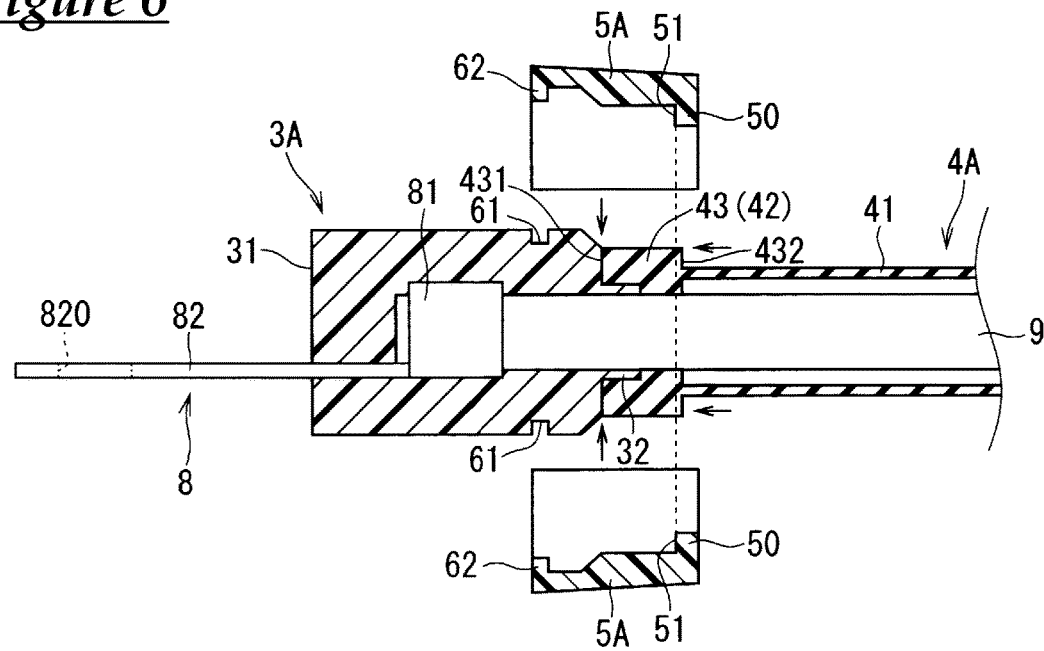
FIG. 6 is an illustrative diagram illustrating part of a manufacturing method for obtaining the molded portion-equipped wiring member according to the second embodiment.

Next, a molded portion-equipped wiring member 200 according to a second embodiment will be described with reference to FIGS. 3 to 6. The molded portion-equipped wiring member 200 includes the conductor portion 9, the terminal 8, a molded portion 3A, a sheath member 4A, and a fixing member 5. FIG. 3 is a lateral cross-sectional view of the molded portion-equipped wiring member 200. FIG. 4 is a side view of the fixing member 5. FIG. 5 is a cross-sectional view of the fixing member 5. FIG. 5 is a cross-sectional view taken along line II-II in FIG. 4. FIG. 6 is an illustrative diagram illustrating part of a manufacturing method for the molded portion-equipped wiring member 200. In FIGS. 3 to 6, constituent elements that are the same as constituent elements shown in FIGS. 1 and 2 are denoted by the same reference signs.

In the present embodiment, the molded portion 3A and the sheath member 4A of the molded portion-equipped wiring member 200 have different configurations from the molded portion 3 and the sheath member 4 of the first embodiment. Note that the conductor portion 9 and the terminal 8 are similar to the first embodiment, and therefore will not be described.

First, the molded portion 3A of the present embodiment will be described. The molded portion 3A is a portion that covers the connection portion between the terminal 8 and the conductor portion 9. Also, here, as shown in FIG. 3, the second end portion 32 of the molded portion 3A projects from the portion of the molded portion 3A that surrounds the conductor connection portion 81, on the side opposite to the terminal 8, and the thickness of the second end portion 32 is relatively thin. The second end portion 32 of the molded portion 3A surrounds the conductor portion 9 in a state where the inner circumferential surface of the second end portion 32 of the molded portion 3A is in contact with the outer circumferential surface of the conductor portion 9. Also, the second end portion 32 of the molded portion 3A is covered by the end portion 42 of the later-described sheath member 4A.

Also, in the present embodiment, a locking portion 61 is formed in the molded portion 3A. Here, the locking portion 61 is formed in the outer circumferential surface of a relatively large portion of the molded portion 3A that surrounds the conductor connection portion 81 (i.e., a portion of the molded portion 3A other than the second end portion 32). The locking portion 61 is a portion that can be locked with a locked portion 62 formed on the later-described fixing member 5. Here, the locking portion 61 is a recession that has a recessed shape and is formed over the entire circumference of the outer circumferential surface of the molded portion 3A.

Next, the sheath member 4A will be described. The sheath member 4A includes an elastic ring-shaped portion 43, which is a portion that is formed at the end portion 42, is capable of elastic deformation, and has an inner circumferential surface that comes into close contact with the outer circumferential surface of the second end portion 32 of the molded portion 3A.

Here, the elastic ring-shaped portion 43 is a portion that, when deformed so as to increase in inner diameter from the natural-state shape, attempts to return to the original state due to the elastic force it has itself. In other words, the elastic ring-shaped portion 43 is a portion that exhibits the properties of rubber. In the second embodiment, due to elastic deformation of the elastic ring-shaped portion 43 that attempts to return to the original state, the inner circumferential surface of the end portion 42 of the sheath member 4A (i.e., the elastic ring-shaped portion 43) comes into close contact with the outer circumferential surface of the second end portion 32 of the molded portion 3A.

For example, the sheath member 4A may be a rubber tube formed so as to have an increased thickness in the end portion 42. If the end portion 42 of the sheath member 4A is formed so as to have a higher thickness than the portion corresponding to the intermediate portion 41, the inner circumferential surface of the end portion 42 (elastic ring-shaped portion 43) can more forcibly come into close contact with the outer circumferential surface of the second end portion 32. Such a sheath member 4A can be obtained by casting performed with use of a mold, for example.

The following describes details of the elastic ring-shaped portion 43 of the present embodiment. Here, the elastic ring-shaped portion 43 is formed so as to have a higher thickness than in the portion corresponding to the intermediate portion 41, as described above. Also, here, the elastic ring-shaped portion 43 is formed such that the outer diameter thereof is higher than the outer diameter of the intermediate portion 41. A later-described pressing surface 51 of the fixing member 5 comes into contact with the end surface of the elastic ring-shaped portion 43 that is on the intermediate portion 41 side (hereinafter, a second-side end surface 432).

Also, here, a configuration is conceivable in which the inner diameter of the elastic ring-shaped portion 43 in the natural state is smaller than the outer diameter of the second end portion 32 of the molded portion 3A. In this case, the inner circumferential surface of the elastic ring-shaped portion 43 forcibly comes into close contact with the outer circumferential surface of the second end portion 32 of the molded portion 3A.

Note that in the present embodiment, in addition to the second end portion 32 of the molded portion 3A, the elastic ring-shaped portion 43 comes into close contact with the outer circumferential surface of a portion of the conductor portion 9 in the extending direction thereof as well. In other words, the elastic ring-shaped portion 43 may include a portion in which the inner diameter of the elastic ring-shaped portion 43 is smaller than the outer diameter of the conductor portion 9 in the natural state. In this case, shifting of the position of the sheath member 4A relative to the conductor portion 9 can be suppressed more reliably. It should be noted that here, the elastic ring-shaped portion 43 is configured such that in the entirety thereof in the axial direction, the inner diameter of the elastic ring-shaped portion 43 is smaller than the outer diameter of the conductor portion 9. Accordingly, the inner circumferential surface of the elastic ring-shaped portion 43 comes into close contact with both the outer circumferential surface of the conductor portion 9 and the outer circumferential surface of the second end portion 32 of the molded portion 3A that surrounds the conductor portion 9.

Note that as another example, the elastic ring-shaped portion may be configured such that the inner diameter in the portion that comes into close contact with the outer circumferential surface of the second end portion of the molded portion is different from the inner diameter in the portion that comes into close contact with the outer circumferential surface of the conductor portion. Also, as yet another example, the elastic ring-shaped portion may come into close contact with only the second end portion of the molded portion. In other words, the inner diameter of the elastic ring-shaped portion in the entirety thereof in the axial direction in the natural state may be larger than the outer diameter of the conductor portion, and is also smaller than the outer diameter of the second end portion of the molded portion.

Next, the fixing member 5 will be described. The fixing member 5 includes a portion (hereinafter, a pressing portion 50) that comes into contact with the elastic ring-shaped portion 43 so as to press a surface thereof that faces the molded portion 3A (here, a first-side end surface 431) against the molded portion 3A. Also, the fixing member 5 is provided with a locked portion 62 that locks with the locking portion 61 when the first-side end surface 431 is pressed against the molded portion 3A.

Here, the fixing member 5 is a ring-shaped member that includes multiple (here, two) fixing member pieces 5A and surrounds the elastic ring-shaped portion 43 and a portion of the molded portion 3A on the second end portion 32 side thereof in a state where the fixing member pieces 5A are mated together. Note that as another example, the fixing member may include multiple fixing member pieces that are coupled by a hinge.

Here, the fixing member 5 is provided with mating maintaining portions 500 that maintain the mated state of the fixing member pieces 5A. As shown in FIGS. 4 and 5, here, the mating maintaining portions 500 each include a locking claw 501 and a locking hole 502. In this case, the inner circumferential surfaces of the fixing member pieces 5A are brought close together while facing each other, and then the locking claw 501 is placed into the locking hole 502. The locking claw 501 accommodated in the locking hole 502 comes into contact with and engages with the inner edge portion of the locking hole 502, thus maintaining the mated state of the two fixing member pieces 5A.

In the present embodiment, the fixing member 5 may be a member that is made of a resin that is harder than the elastic ring-shaped portion 43, for example. This is for pressing the elastic ring-shaped portion 43 toward the molded portion 3A.

Also, here, the fixing member 5 is further configured such that the inner diameter of the portion thereof that surrounds the elastic ring-shaped portion 43 is smaller than the outer diameter of the elastic ring-shaped portion 43 in the state of surrounding the second end portion 32 of the molded portion 3A. In this case, the fixing member pieces 5A are mated together in a state where the elastic ring-shaped portion 43 is interposed between the fixing member pieces 5A, and thus can press the elastic ring-shaped portion 43 toward the second end portion 32 of the molded portion 3A along the diameter direction of the elastic ring-shaped portion 43. In other words, here, due to the fixing member 5, the inner circumferential surface of the elastic ring-shaped portion 43 comes into closer contact with the outer circumferential surface of the second end portion 32 of the molded portion 3A and the outer circumferential surface of the conductor portion 9.

Also, the fixing member 5 is provided with the locked portion 62 that can be locked with the locking portion 61 formed in the outer circumferential surface of the molded portion 3A. Here, as shown in FIGS. 3 and 4, the locked portion 62 is formed on the inner circumferential surface on a first end 58 side in the axial direction of the fixing member 5. Here, the locked portion 62 is shaped as a protrusion on the inner circumferential surface side of the fixing member 5, and is formed so as to be capable of catching the locking portion 61 in a state of being accommodated in the locking portion 61.

Also, here, as shown in FIGS. 3 and 4, the pressing portion 50, which is provided with a pressing surface 51 that comes into contact with the second-side end surface 432 of the elastic ring-shaped portion 43, is formed on a second end 59 side of the fixing member 5. The pressing portion 50 is a portion that is shaped as protrusion on the inner circumferential surface side of the fixing member 5. The pressing surface 51 of the pressing portion 50 presses the second-side end surface 432 of the elastic ring-shaped portion 43 toward the molded portion 3A in a state where the first-side end surface 431 of the elastic ring-shaped portion 43 is in contact with the molded portion 3A. Accordingly, the first-side end surface 431 of the elastic ring-shaped portion 43 is relatively forcibly pressed against the molded portion 3A, and the formation of a gap therebetween that can become a liquid intrusion path is suppressed.

Here, as shown in FIG. 6, in the molded portion 3A and the sheath member 4A in the state where the fixing member 5 is not attached and the first-side end surface 431 of the elastic ring-shaped portion 43 is in contact with the molded portion 3A, the length from the first end 58 to the pressing surface 51 in the axial direction of the fixing member 5 is smaller than the length from the portion of the recessed locking portion 61 of the molded portion 3A that is nearest to the first end portion 31 to the second-side end surface 432 of the elastic ring-shaped portion 43 in the direction from the first end portion 31 of the molded portion 3A to the second end portion 32 (i.e., the extending direction of the molded portion 3A). In this case, due to the fixing member 5 being attached, the pressing surface 51 of the pressing portion 50 can relatively forcibly press the second-side end surface 432 of the elastic ring-shaped portion 43 toward the molded portion 3A. In other words, it is possible to suppress the formation of a gap between the first-side end surface 431 of the elastic ring-shaped portion 43 and the molded portion 3A.

The following describes a method for obtaining the molded portion-equipped wiring member 200 of the present embodiment. In the present embodiment, first, molding processing is performed to mold the molded portion 3A that covers the connection portion between the terminal 8 and the conductor portion 9. Then, after the molded portion 3A is formed, the sheath member 4A is arranged so as to surround the conductor portion 9 and the second end portion 32 of the molded portion 3A.

Then, as shown in FIG. 6, the fixing member 5 is attached in a state where the first-side end surface 431 of the elastic ring-shaped portion 43 is in contact with the molded portion 3A. Here, as described above, in the molded portion 3A and the sheath member 4A in the state where the fixing member 5 is not attached and the first-side end surface 431 of the elastic ring-shaped portion 43 is in contact with the molded portion 3A, the length from the first end 58 to the pressing surface 51 in the axial direction of the fixing member 5 is smaller than the length from the portion of the recessed locking portion 61 of the molded portion 3A that is nearest to the first end portion 31 to the second-side end surface 432 of the elastic ring-shaped portion 43 in the extending direction of the molded portion 3A. For this reason, here, as shown in FIG. 6, in the state where the second-side end surface 432 of the elastic ring-shaped portion 43 is pressed toward the molded portion 3A, the fixing member pieces 5A are brought together from around the elastic ring-shaped portion 43, thus attaching the fixing member 5. The locked portion 62 of the fixing member 5 and the locking portion 61 of the molded portion 3A are locked together so as to maintain the state where the pressing surface 51 of the pressing portion 50 of the fixing member 5 presses the second-side end surface 432 of the elastic ring-shaped portion 43 toward the molded portion 3A. Accordingly, the first-side end surface 431 of the elastic ring-shaped portion 43 is in close contact with the molded portion 3A, and the formation of a gap therebetween that can become a liquid intrusion path is suppressed.

In the present embodiment as well, a gap is formed between the intermediate portion 41 of the sheath member 4A and the conductor portion 9, and therefore the conductor portion 9 (i.e., the wiring portion of the molded portion-equipped wiring member 200) can bend relatively easily. Accordingly, the wiring portion has excellent flexibility in the molded portion-equipped wiring member 200.

Also, in the present embodiment, due to the elastic force of the elastic ring-shaped portion 43, the inner circumferential surface of the elastic ring-shaped portion 43 comes into close contact with the outer circumferential surface of the second end portion 32 of the molded portion 3A, thus more reliably suppressing the intrusion of a liquid through a space between the inner circumferential surface of the elastic ring-shaped portion 43 and the outer circumferential surface of the second end portion 32 of the molded portion 3A. In other words, the water-stopping capability of the molded portion-equipped wiring member 200 is further improved.

Also, in the present embodiment, the surface of the elastic ring-shaped portion 43 that faces the molded portion 3A (i.e., the first-side end surface 431) is pressed against the molded portion 3A. Also, the state where the first-side end surface 431 of the elastic ring-shaped portion 43, which faces the molded portion 3A, is pressed against the molded portion 3A is maintained by the locking of the locking portion 61 and the locked portion 62. Accordingly, the intrusion of a liquid therebetween can be more reliably suppressed. In other words, in the second embodiment, the molded portion-equipped wiring member 200 can be provided with a water-stop property without using an adhesive.

Third Embodiment

Figure 7:
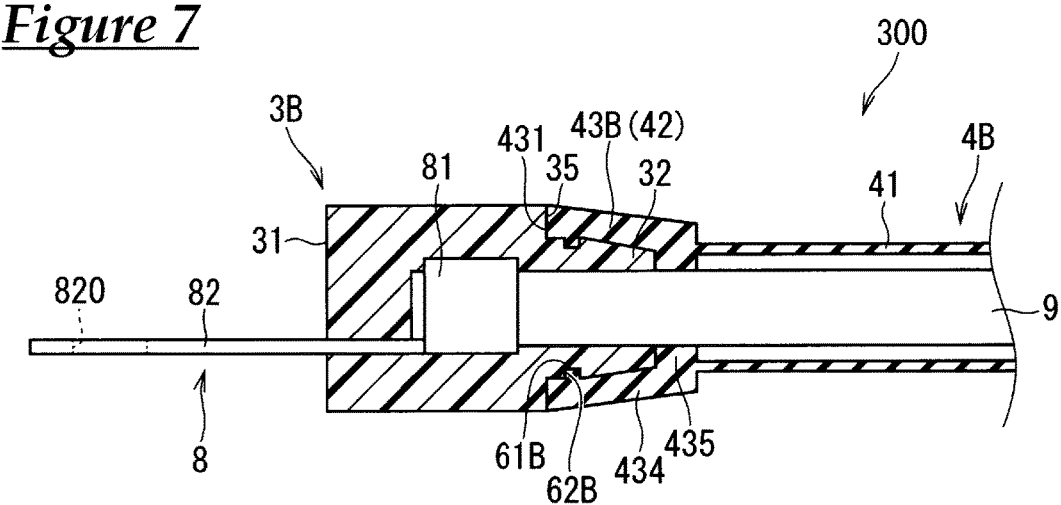
FIG. 7 is a cross-sectional view of a molded portion-equipped wiring member according to a third embodiment.
Figure 8:
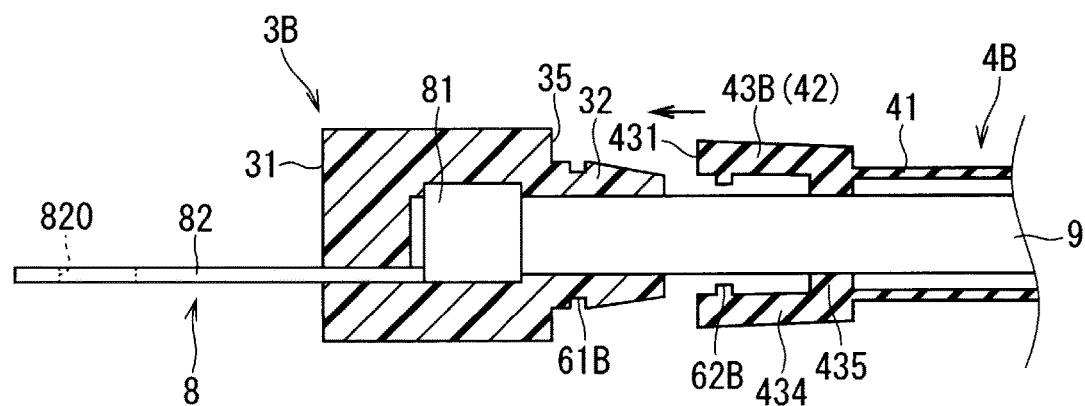
FIG. 8 is an illustrative diagram illustrating part of a manufacturing method for obtaining the molded portion-equipped wiring member according to the third embodiment.

Next, a molded portion-equipped wiring member 300 according to a third embodiment will be described with reference to FIGS. 7 and 8. The molded portion-equipped wiring member 300 includes the conductor portion 9, the terminal 8, a molded portion 3B, and a sheath member 4B. FIG. 7 is a lateral cross-sectional view of the molded portion-equipped wiring member 300. FIG. 8 is an illustrative diagram illustrating part of a manufacturing method for the molded portion-equipped wiring member 300. In FIGS. 7 and 8, constituent elements that are the same as constituent elements shown in FIGS. 1 to 6 are denoted by the same reference signs.

In the present embodiment, the molded portion 3B and the sheath member 4B of the molded portion-equipped wiring member 300 have different configurations from the molded portions 3 and 3A and the sheath members 4 and 4A of the first and second embodiments. Note that the conductor portion 9 and the terminal 8 are similar to the first embodiment and the second embodiment, and therefore will not be described.

First, the molded portion 3B of the present embodiment will be described. The molded portion 3B is a portion that covers the connection portion between the terminal 8 and the conductor portion 9. Here, the second end portion 32 of the molded portion 3B surrounds the conductor portion 9 in a state where the inner circumferential surface of the second end portion 32 of the molded portion 3B is in contact with the outer circumferential surface of the conductor portion 9.

Here, as shown in FIG. 7, the second end portion 32 of the molded portion 3B projects from the portion of the molded portion 3B that surrounds the conductor connection portion 81, on the side opposite to the terminal 8, and the thickness of the second end portion 32 is relatively thin. The second end portion 32 of the molded portion 3B is covered by the end portion 42 of the later-described sheath member 4B. Also, here, the outer circumferential surface of the second end portion 32 of the molded portion 3B includes an inclined surface that is inclined such that the thickness of the second end portion 32 gradually decreases in a direction from the first end portion 31 side of the molded portion 3B toward the second end portion 32 side. In this case, the operation of placing the elastic ring-shaped portion 43B of the sheath member 4B over the second end portion 32 of the molded portion 3B can be performed more easily.

Also, in the present embodiment, a locking portion 61B is formed in the molded portion 3B. Here, the locking portion 61B is formed in the outer circumferential surface of the second end portion 32 of the molded portion 3B. The locking portion 61B is a portion that can be locked with a later-described locked portion 62B that is formed on the elastic ring-shaped portion 43B. Here, the locking portion 61B is a recession that has a recessed shape and is formed over the entire circumference of the outer circumferential surface of the molded portion 3B.

Next, the sheath member 4B will be described. The sheath member 4B includes an elastic ring-shaped portion 43B, which is a portion that is formed at the end portion 42, is capable of elastic deformation, and has an inner circumferential surface that comes into close contact with the outer circumferential surface of the second end portion 32 of the molded portion 3B.

Here, the elastic ring-shaped portion 43B is a portion that, when deformed so as to increase in inner diameter from the natural-state shape, attempts to return to the original state due to the elastic force it has itself. In other words, the elastic ring-shaped portion 43B is a portion that exhibits the properties of rubber. In the third embodiment, due to elastic deformation of the elastic ring-shaped portion 43B that attempts to return to the original state, the inner circumferential surface of the end portion 42 of the sheath member 4B (i.e., the elastic ring-shaped portion 43B) comes into close contact with the outer circumferential surface of the second end portion 32 of the molded portion 3B. For example, the sheath member 4B may be a rubber tube formed so as to have an increased thickness in the end portion 42, similarly to the second embodiment.

The following describes details of the elastic ring-shaped portion 43B of the present embodiment. Here, the elastic ring-shaped portion 43B is formed so as to have a higher thickness than in the portion corresponding to the intermediate portion 41, as described above. Note that here, the elastic ring-shaped portion 43B is formed such that the outer diameter thereof is higher than the outer diameter of the intermediate portion 41.

Also, here, as shown in FIG. 7, the inner circumferential surface of the elastic ring-shaped portion 43B comes into close contact with the outer circumferential surface of the conductor portion 9 as well, in addition to the second end portion 32 of the molded portion 3B. Accordingly, the inner diameter of the elastic ring-shaped portion 43B in the natural state may be configured to be smaller than the outer diameter of the conductor portion 9. More specifically, here, the elastic ring-shaped portion 43B includes a portion (first portion 434) having a smaller outer diameter than the second end portion 32 of the molded portion 3B, and a portion (second portion 435) having a smaller outer diameter than the conductor portion 9, in the natural state. In this case, the elastic ring-shaped portion 43B comes into close contact with the outer circumferential surface of the second end portion 32 of the molded portion 3B in the first portion 434, and comes into close contact with the outer circumferential surface of the conductor portion 9 in the second portion 435. The first portion 434 and the second portion 435 are formed side-by-side in the axial direction of the elastic ring-shaped portion 43B. In this case, shifting of the position of the sheath member 4B relative to the conductor portion 9 can be suppressed more reliably.

Note that as another example, a case is also conceivable in which the second portion 435 is omitted from the elastic ring-shaped portion 43B, that is to say the elastic ring-shaped portion comes into close contact with only the second end portion of the molded portion.

Also, in the present embodiment, the locked portion 62B that can be locked with the locking portion 61B of the molded portion 3B is formed on the elastic ring-shaped portion 43B. Here, the locked portion 62B is formed on the inner circumferential surface side of the first portion 434 of the elastic ring-shaped portion 43B. The locked portion 62B is shaped as a protrusion on the inner circumferential surface side of the elastic ring-shaped portion 43B, and is formed so as to be capable of catching the locking portion 61B in a state of being accommodated in the locking portion 61B.

In other words, in the third embodiment, the elastic ring-shaped portion 43B is provided with the locked portion 62B that is locked with the locking portion 61B in the state where the surface of the elastic ring-shaped portion 43B that faces the molded portion 3B (here, the first-side end surface 431) is pressed against the molded portion 3B.

Also, here, the length from the first-side end surface 431 to the locked portion 62B in the axial direction of the elastic ring-shaped portion 43B in the natural state is larger than the length from the surface 35 on the second end portion 32 side of the portion of the molded portion 3B that surrounds the conductor connection portion 81 to the locking portion 61B. For this reason, in the state where the locking portion 61B and the locked portion 62B are locked together, the first-side end surface 431 of the elastic ring-shaped portion 43B is forcibly pressed against the surface 35 of the molded portion 3B, thus suppressing the formation of a gap therebetween.

The following describes a method for obtaining the molded portion-equipped wiring member 300 of the present embodiment. In the present embodiment, first, molding processing is performed to mold the molded portion 3B that covers the connection portion between the terminal 8 and the conductor portion 9.

Then, after the molded portion 3B is formed, the sheath member 4B is arranged so as to surround the conductor portion 9 and the second end portion 32 of the molded portion 3B. Specifically, the sheath member 4B is moved toward the molded portion 3B along the extending direction of the conductor portion 9 in the state where the conductor portion 9 has been inserted therein.

The locked portion 62B formed on the elastic ring-shaped portion 43B is then locked with the locking portion 61B of the molded portion 3B, thus fixing the molded portion 3B and the sheath member 4B. At this time, in the present embodiment, as described above, the length from the first-side end surface 431 to the locked portion 62B in the axial direction of the elastic ring-shaped portion 43B in the natural state is larger than the length from the surface 35 on the second end portion 32 side of the portion of the molded portion 3B that surrounds the conductor connection portion 81 to the locking portion 61B. For this reason, the locking portion 61B and the locked portion 62B are locked together so as to maintain the state where the first-side end surface 431 of the elastic ring-shaped portion 43B is forcibly pressed against the surface 35 of the molded portion 3B.

Also, here, the inner circumferential surface of the elastic ring-shaped portion 43B comes into close contact with the outer circumferential surface of the second end portion 32 of the molded portion 3B and the outer circumferential surface of the conductor portion 9. Accordingly, it is possible to suppress shifting of the position of the sheath member 4B relative to the conductor portion 9 and the molded portion 3B.

In the present embodiment as well, a gap is formed between the intermediate portion 41 of the sheath member 4B and the conductor portion 9, and therefore the conductor portion 9 (i.e., the wiring portion of the molded portion-equipped wiring member 300) can bend relatively easily. Accordingly, the wiring portion has excellent flexibility in the molded portion-equipped wiring member 300.

Also, in the present embodiment, the first-side end surface 431 of the elastic ring-shaped portion 43B that faces the molded portion 3B is pressed against the molded portion 3B, thus suppressing the formation of a gap therebetween. Also, the state where the first-side end surface 431 of the elastic ring-shaped portion 43B, which faces the molded portion 3B, is pressed against the molded portion 3B is maintained by the locking of the locking portion 61B and the locked portion 62B. As a result, the intrusion of a liquid through a space between the first-side end surface 431 and the molded portion 3B can be more reliably suppressed. In other words, in the third embodiment, the molded portion-equipped wiring member 300 can be provided with a water-stop property without using an adhesive.

Also, in the third embodiment, it is possible to suppress an increase in the number of parts that constitute the molded portion-equipped wiring member 300.

APPLICATION EXAMPLES

A configuration is possible in which the locking portion is formed as a protrusion on the outer circumferential surface of the molded portion, and the locked portion is formed as a recession in the inner circumferential surface of the fixing member or the inner circumferential surface side of the elastic ring-shaped portion.

In the first embodiment, the sheath member may be formed by a member other than a heat shrink tube. For example, the sheath member may be obtained by the end portion of a rubber tube, whose inner diameter is larger than the outer diameter of the conductor portion, being attached to the outer circumferential surface of the conductor portion.

In the second embodiment, the fixing member may be omitted. In other words, the elastic ring-shaped portion may be in close contact with and cover the outer circumferential surface of the second end portion of the molded portion due to only the elastic force of the elastic ring-shaped portion of the sheath member.

Note that in the molded portion-equipped wiring member according to the present disclosure, the embodiments and application examples described above can be freely combined, and modifications or partial omissions may be appropriately applied to the embodiments and application examples, within the scope of the invention described in the claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 First adhesive
100 Molded portion-equipped wiring member
2 Second adhesive
200 Molded portion-equipped wiring member
3 Molded portion
300 Molded portion-equipped wiring member
31 First end portion
32 Second end portion
3A Molded portion
3B Molded portion
4 Sheath member
41 Intermediate portion
42 End portion
43 Elastic ring-shaped portion
4A Sheath member
4B Sheath member
5 Fixing member
50 Pressing portion
61 Locking portion
62 Locked portion
8 Terminal
9 Conductor portion

The invention claimed is:
1. A molded portion-equipped wiring member comprising:
a conductor portion that is wire-shaped;

a terminal that is connected to an end portion of the conductor portion;

a molded portion that covers a connection portion between the conductor portion and the terminal such that the terminal projects from a first end portion side and the conductor portion extends from a second end portion side;

a sheath member that surrounds the conductor portion in a state where a gap of separation from the conductor portion is formed in an intermediate portion, the sheath member being in close contact with a second end portion of the molded portion in an end portion, wherein an outer circumferential surface of the end portion of the sheath member and an inner circumferential surface of the second end portion of the molded portion are in close contact with each other; and a first adhesive that is provided between the outer circumferential surface of the end portion of the sheath member and the inner circumferential surface of the second end portion of the molded portion, and that causes the outer circumferential surface of the end portion of the sheath member and the inner circumferential surface of the second end portion of the molded portion to be in close contact with each other.

2. A molded portion-equipped wiring member comprising:

a conductor portion that is wire-shaped;

a terminal that is connected to an end portion of the conductor portion;

a molded portion that covers a connection portion between the conductor portion and the terminal such that the terminal projects from a first end portion side and the conductor portion extends from a second end portion side;

a sheath member that surrounds the conductor portion in a state where a gap of separation from the conductor portion is formed in an intermediate portion, the sheath member being in close contact with a second end portion of the molded portion in an end portion; and a second adhesive that is provided between an inner circumferential surface of the end portion of the sheath member and an outer circumferential surface of the conductor portion, and causes the inner circumferential surface of the end portion of the sheath member and the outer circumferential surface of the conductor portion to be in close contact with each other.

3. A molded portion-equipped wiring member comprising:

a conductor portion that is wire-shaped;

a terminal that is connected to an end portion of the conductor portion;

a molded portion that covers a connection portion between the conductor portion and the terminal such that the terminal projects from a first end portion side and the conductor portion extends from a second end portion side; and a sheath member that surrounds the conductor portion in a state where a gap of separation from the conductor portion is formed in an intermediate portion, the sheath member being in close contact with a second end portion of the molded portion in an end portion;

wherein the sheath member includes an elastic ring-shaped portion that is a portion formed at the end portion, is capable of undergoing elastic deformation, and has an inner circumferential surface that comes into close contact with an outer circumferential surface of the second end portion of the molded portion.

4. The molded portion-equipped wiring member according to claim 3, wherein a locking portion is formed in the molded portion, and the molded portion-equipped wiring member further comprises a fixing member that includes a portion that comes into contact with the elastic ring-shaped portion so as to press a surface of the elastic ring-shaped portion that faces the molded portion against the molded portion, the fixing member being provided with a locked portion that is locked together with the locking portion in a state where the surface of the elastic ring-shaped portion that faces the molded portion is pressed against the molded portion.

5. The molded portion-equipped wiring member according to claim 3, wherein a locking portion is formed in the molded portion, and the elastic ring-shaped portion is provided with a locked portion that is locked together with the locking portion in a state where a surface of the elastic ring-shaped portion that faces the molded portion is pressed against the molded portion.

* * * * *